US012785833B2

United States Patent
Noh et al.

(10) Patent No.: US 12,785,833 B2
(45) Date of Patent: Nov. 3, 2026

(54) METHOD AND APPARATUS FOR GENERATING SIGNAL STRENGTH PREDICTION MODEL

(71) Applicant: AGENCY FOR DEFENSE DEVELOPMENT, Daejeon (KR)

(72) Inventors: Eon Su Noh, Daejeon (KR); Jae Don Park, Daejeon (KR); Yong Woo Park, Daejeon (KR); Dong Yeob Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 161 days.

(21) Appl. No.: 18/999,028

(22) Filed: Dec. 23, 2024

(65) Prior Publication Data

US 2026/0121775 A1 Apr. 30, 2026

(30) Foreign Application Priority Data

Oct. 25, 2024 (KR) ........................ 10-2024-0147693

(51) Int. Cl.
*H04B 17/391* (2015.01)
*H04B 7/00* (2006.01)

(52) U.S. Cl.
CPC ........... *H04B 17/3913* (2015.01); *H04B 7/00* (2013.01)

(58) Field of Classification Search
CPC .............................. H04B 17/3913; H04B 7/00
See application file for complete search history.

(56) References Cited

U.S. PATENT DOCUMENTS 7,583,961 B2 9/2009 Kappes et al.
2021/0025962 A1* 1/2021 Smyth ..................... G01S 11/06
2025/0055534 A1* 2/2025 Saber .................. H04L 25/0202
2025/0253965 A1* 8/2025 Isaac ................... H04L 25/0212

FOREIGN PATENT DOCUMENTS

CN 118474688 A * 8/2024 ............ G06N 3/084
KR 10-0497894 B1 6/2005
KR 2006-0047566 A 5/2006
KR 10-1477041 B1 1/2015

OTHER PUBLICATIONS

Ahrens, "Convolutional-Type Neural Network for Fading Channel Forecasting", 2020, IEEE Access, vol. 8, 193075-193090 (Year: 2020).*

* cited by examiner

*Primary Examiner* — Raymond S Dean
(74) *Attorney, Agent, or Firm* — MILES & STOCKBRIDGE P.C.

(57) ABSTRACT

Systems, devices, methods, and instructions for generating a signal strength prediction model, including generating an input dataset including at least one of distance information of a radio wave, measurement environment information, and information on a received signal strength value, obtaining an optimal correction coefficient based on the input dataset using a large-scale fading learning model, determining an optimal hyperparameter of an artificial neural network model based on the optimal correction coefficient using a small-scale fading learning model, and generating a prediction model for predicting a signal strength of a received wave for an arbitrary transmitted wave based on the optimal hyperparameter.

10 Claims, 9 Drawing Sheets

METHOD AND APPARATUS FOR GENERATING SIGNAL STRENGTH PREDICTION MODEL

PRIORITY APPLICATION

This application claims the benefit of Korean Patent Application No. 10-2024-0147693, filed on Oct. 25, 2024, in the Korean Intellectual Property Office, the disclosure of which is incorporated herein by reference in its entirety

FIELD OF THE INVENTION

The present disclosure relates to systems, devices, methods, and instructions for generating a signal strength prediction model, and one particular implementation relates to generating a model for predicting the strength of a received signal of a radio wave by considering large-scale fading and small-scale fading in a maritime visible environment.

DESCRIPTION OF THE RELATED ART

Maritime wireless communication is gaining attention as a key technology element of mobile communication for high-speed data transmission over a wide area. In order to design a stable network between maritime users, such as ships and unmanned surface vehicles, and ground base stations, it is essential to accurately predict the user's received signal strength.

The received signal strength can be predicted using an empirical model formulated based on measured data and a deterministic model based on electromagnetic theory. Since the empirical model predicts the signal strength based on a simple formula, it is relatively fast and has high computing efficiency, but the prediction accuracy is relatively low. Therefore, in order to improve the prediction accuracy in a new radio environment, the data of received signal strength measured in various environments should be reflected when creating the empirical model.

The artificial neural network model can be utilized to predict the received signal strength by learning features that affect the radio environment. In particular, since it can nonlinearly model the influence between features and labels, the prediction accuracy is higher than that of the empirical model. In addition, pre-trained artificial neural network models based on measurement data, simulation data, etc. are faster and more computationally efficient than deterministic models, and can further increase accuracy by learning the prediction errors of empirical or deterministic models

SUMMARY OF THE INVENTION

An aspect provides an electronic apparatus for generating a model for predicting a received signal strength of a user in a maritime environment.

The technical aspects of the present disclosure are not limited to those mentioned above, and other aspects that are not mentioned will be clearly understood by those skilled in the art to which the present disclosure pertains from the following description.

According to an aspect, there is provided a method for generating a signal strength prediction model in an electronic apparatus, the method including generating an input dataset including at least one of distance information of a radio wave, measurement environment information, and information on a received signal strength value, obtaining an optimal correction coefficient based on the input dataset using a large-scale fading learning model, determining an optimal hyperparameter of an artificial neural network model based on the optimal correction coefficient using a small-scale fading learning model, and generating a prediction model for predicting a signal strength of a received wave for an arbitrary transmitted wave based on the optimal hyperparameter.

In the method for generating a signal strength prediction model in an electronic apparatus according to an example embodiment, the optimal correction coefficient may minimize a residual of an output of the large-scale fading learning model and the received signal strength value.

In the method for generating a signal strength prediction model in an electronic apparatus according to an example embodiment, the distance information may include distances for a direct path and an indirect path of the radio wave from a transmitting antenna to a receiving antenna, and the measurement environment information may include at least one of information on the transmitting antenna and the receiving antenna, and information on a maritime environment from which the information on the received signal strength value is obtained.

In the method for generating a signal strength prediction model in an electronic apparatus according to an example embodiment, the optimal correction coefficient may include a first correction coefficient for the direct path and the indirect path, a second correction coefficient for a difference between the direct path and the indirect path, and a third correction coefficient for correcting an output value of the large-scale fading learning model.

In the method for generating a signal strength prediction model in an electronic apparatus according to an example embodiment, determining the optimal hyperparameter may include determining the optimal hyperparameter based on the input dataset and the residual.

In the method for generating a signal strength prediction model in an electronic apparatus according to an example embodiment, the optimal hyperparameter may minimize a sum of squared errors of an output of the artificial neural network and the residual.

In the method for generating a signal strength prediction model in an electronic apparatus according to an example embodiment, the optimal hyperparameter may include a number of nodes in a hidden layer of the artificial neural network model.

In the method for generating a signal strength prediction model in an electronic apparatus according to an example embodiment, the prediction model may output a sum of an output of the large-scale fading learning model with the optimal correction coefficient reflected and an output of the artificial neural network model with the optimal hyperparameter set.

According to another aspect, there is provided a non-transitory computer-readable storage medium having a program for executing on a computer a method for generating a prediction model in an electronic apparatus recorded thereon, the method including generating an input dataset including at least one of distance information of a radio wave, measurement environment information, and information on a received signal strength value, obtaining an optimal correction coefficient based on the input dataset using a large-scale fading learning model, determining an optimal hyperparameter of an artificial neural network model based on the optimal correction coefficient using a small-scale fading learning model, and generating a prediction model for predicting a signal strength of a received wave for an arbitrary transmitted wave based on the optimal hyperparameter.

According to yet another aspect, there is provided an electronic apparatus for performing a method for generating a prediction model, the electronic apparatus including a processor, and one or more memory for storing one or more instructions. The one or more instructions, when executed, causes the processor to generate an input dataset including at least one of distance information of a radio wave, measurement environment information, and information on a received signal strength value, obtain an optimal correction coefficient based on the input dataset using a large-scale fading learning model, determine an optimal hyperparameter of an artificial neural network model based on the optimal correction coefficient using a small-scale fading learning model, and generate a prediction model for predicting a signal strength of a received wave for an arbitrary transmitted wave based on the optimal hyperparameter.

The various example embodiments of the present disclosure described above are only some of the example embodiments of the present disclosure, and various other example embodiments reflecting the technical features of the various example embodiments of the present disclosure can be derived and understood by those skilled in the art based on the detailed description set forth below.

The present disclosure has a technical effect in that it enables the generation of a model that accurately predicts the received signal strength of a radio wave, taking into account various maritime environmental parameters, including large-scale fading and small-scale fading.

The effects of the present disclosure are not limited to the effects mentioned above, and other effects not mentioned will be clearly understood by those skilled in the art from the following description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
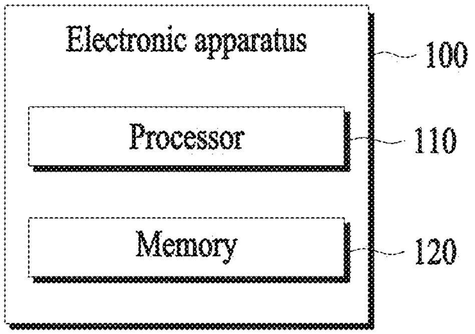
FIG. 1 is a diagram illustrating an electronic apparatus according to an example embodiment.

The following example embodiments are combinations of components and features of various example embodiments in predetermined forms. Each component or feature may be considered as optional unless explicitly stated otherwise. Each component or feature may be implemented in a form that is not combined with other components or features. In addition, various example embodiments may be configured by combining some components and features. The order of operations described in various example embodiments may be changed. Some configurations or features of one example embodiment may be included in other example embodiments, or may be replaced with corresponding configurations or features of other example embodiments.

In describing the drawings, descriptions of procedures or operations that may obscure the gist of various example embodiments are not described, and procedures or operations that are understandable at the level of those skilled in the art are not described either.

Throughout the specification, when it is stated that a part "comprises" or "includes" a certain component, it means that other components may further be included, and it does not preclude other components, unless otherwise stated. In addition, terms such as "... part", "... unit", "... module", and the like described in the specification mean a unit for performing at least one function or operation, which may be implemented as hardware or software, or as a combination of hardware and software. In addition, "a", "an", "one", "the" and similar related terms are used herein in a sense encompassing both the singular and the plural in the context of describing various example embodiments (especially in the context of the following claims) unless otherwise indicated or clearly contradicted by context.

Hereinafter, preferred implementations according to various example embodiments will be described in detail with reference to the accompanying drawings. The detailed description to be disclosed below with the accompanying drawings is intended to describe exemplary implementations of various example embodiments, and is not intended to represent the only implementation.

In addition, specific terms used in various example embodiments are provided to aid understanding of various example embodiments, and the use of these specific terms may be changed in other forms without departing from the technical spirit of the various example embodiments.

As the maritime environment, such as sea level, roughness, tide level, and wave height, changes over time, radio waves are reflected and scattered, which may cause both large-scale (i.e., first scale) fading and small-scale (i.e., second scale) fading of radio waves. This may increase the error between the actual received signal strength and the predicted received signal strength of the ship's receiver.

While it is common to generate a prediction model by individually considering each of the maritime environment factors to predict the received signal strength, the complex interactions between the maritime environment factors can cause unpredictable fading of the received signal strength, which can reduce the prediction accuracy of the model.

The method for generating a received signal strength prediction model proposed in this disclosure aims to generate a model that can accurately predict the received signal strength by simultaneously predicting large-scale fading and small-scale fading, taking into account various maritime environmental parameters.

FIG. 1 is a diagram illustrating an electronic apparatus according to an example embodiment.

Referring to FIG. 1, the electronic apparatus 100 may include a processor 110 and a memory 120. The electronic apparatus 100 illustrated in FIG. 1 shows only the components associated with the present example embodiment. Accordingly, it will be understood by those skilled in the art related to the present example embodiment that other general purpose components may be included in addition to the components illustrated in FIG. 1. For example, the electronic apparatus 100 may include a communication device including one or more transceivers, an input unit, and an output unit. The communication device is a device for performing wired or wireless communication and may communicate with an external electronic apparatus. The external electronic apparatus may be a terminal or a server. The communication technologies utilized by the communication device may include Global System for Mobile communication (GSM), Code Division Multi Access (CDMA), Long Term Evolution (LTE), 5G, Wireless LAN (WLAN), Wireless-Fidelity (Wi-Fi), Bluetooth, Radio Frequency Identification (RFID), Infrared Data Association (IrDA), ZigBee, Near Field Communication (NFC), and the like. The input unit may be, for example, a traditional keypad or keyboard, a mouse, a microphone for receiving voice signals, a camera, and various other forms of input means for sensing or receiving user input. The output unit may be, for example, a display that outputs images, a speaker that outputs sound, a haptic device that generates vibrations, and various other forms of output means.

The electronic apparatus 100 of FIG. 1 may generate an input dataset including at least one of distance information of a radio wave, measurement environment information, and information on a received signal strength value. Then, the electronic apparatus 100 may obtain an optimal correction coefficient based on the input dataset, using a large-scale fading learning model. In addition, the electronic apparatus 100 may determine an optimal hyperparameter of an artificial neural network model based on the optimal correction coefficient, using a small-scale fading learning model. Further, the electronic apparatus 100 may generate a prediction model for predicting a signal strength of a received wave for an arbitrary transmitted wave based on the optimal hyperparameter.

The processor 110 serves to control the overall functionality of the electronic apparatus 100. For example, the processor 110 provides overall control of the electronic apparatus 100 by executing programs stored in the memory 120 within the electronic apparatus 100. The processor 110 may be implemented as a central processing unit (CPU), graphics processing unit (GPU), application processor (AP), or the like within the electronic apparatus 100, but is not limited thereto.

The memory 120 is hardware that stores various data processed within the electronic apparatus 100, and the memory 120 may store data that has been processed and data to be processed by the electronic apparatus 100. The memory 120 may also store applications, drivers, and the like to be executed by the electronic apparatus 100. The memory 120 may include random access memory (RAM), such as dynamic random access memory (DRAM), static random access memory (SRAM), or the like, read-only memory (ROM), electrically erasable programmable read-only memory (EEPROM), CD-ROM, Blu-ray or other optical disk storage, hard disk drive (HDD), solid state drive (SSD), or flash memory.

The disclosed method of generating a signal strength prediction model performed by the electronic apparatus 100 of FIG. 1 may also be implemented by a non-transitory storage medium (or non-transitory recording medium) readable by a computer for its operation. The method of generating a signal strength prediction model may be implemented as a software module or algorithm and stored on a computer-readable recording medium as computer-readable code or program instructions executable on the processor 110. Computer-readable recording media include magnetic storage media (e.g., read-only memory (ROM), random-access memory (RAM), floppy disks, hard disks, etc.) and optical readable media (e.g., CD-ROMs, digital versatile discs (DVDs)). The computer-readable recording medium may be distributed across networked computer systems so that computer-readable code may be stored and executed in a distributed manner. The medium may be readable by a computer, stored in memory, and executed by the processor 110.

Figure 2:
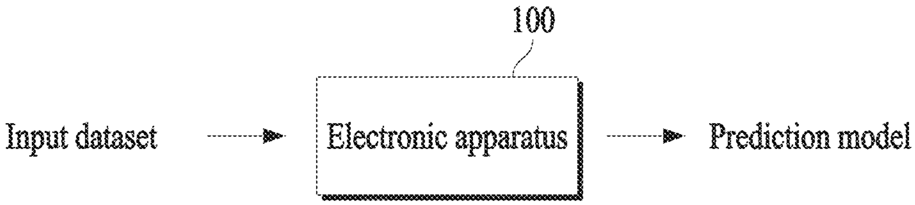
FIG. 2 is a diagram illustrating an environment for generating a signal strength prediction model according to an example embodiment.

FIG. 2 is a diagram illustrating an environment for generating a signal strength prediction model according to an example embodiment;

Referring to FIG. 2, a signal strength prediction model generation apparatus (hereinafter referred to as an "electronic apparatus") 100 according to an example embodiment may generate a prediction model using an input dataset. As an example, the input dataset may include at least one of distance information of a radio wave, measurement environment information, and information on a received signal strength value.

In an example embodiment, the electronic apparatus 100 may include a data collection part (not shown), a learning part (not shown), and a prediction part (not shown). The data collection part (not shown) may include a transmitting and receiving antenna, and may collect measurement environment information. The learning part (not shown) may train a prediction model to predict a signal strength of a received wave for an arbitrary transmitted wave based on the information collected by the data collection part (not shown). For example, the learning part (not shown) may generate an input dataset based on the information collected by the data collection part (not shown) and train a prediction model based on the input dataset. The prediction part (not shown) may use the trained model to predict the received signal strength. For example, the prediction part (not shown) may input the distance information of the radio wave corresponding to the received wave for which the signal strength is to be predicted and the measurement environment information to the trained prediction model, and determine the value output by the prediction model as a predicted value of the received signal strength. Alternatively, for example, the prediction part (not shown) may be the trained prediction model itself. That is, the learning part (not shown) may train the prediction part (not shown) based on the information collected by the data collection part (not shown).

The data collection part (not shown), the learning part (not shown), and the prediction part (not shown) described above as components of the electronic apparatus 100 are explained as being configured as separate modules, but this is only for convenience of explanation, and the operations of the aforementioned components may be performed by a single processor.

Hereinafter, referring to FIGS. 3A and 3B, specific example embodiments will be described with respect to an input dataset that is input to the electronic apparatus 100.

Figure 3A:
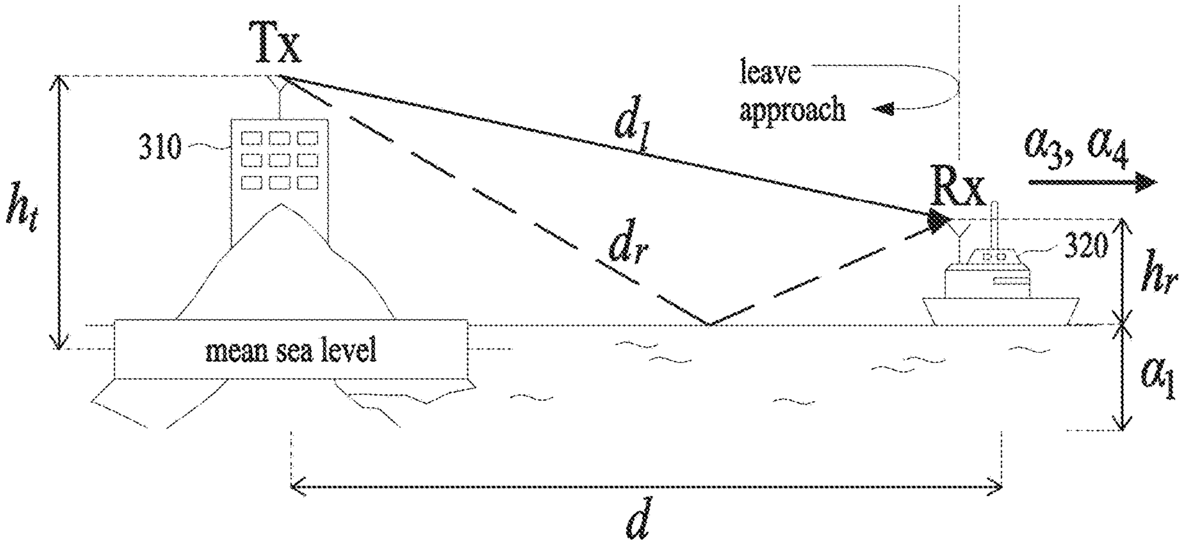
FIGS. 3A and 3B are diagrams illustrating an input data set according to an example embodiment.
Figure 3B:
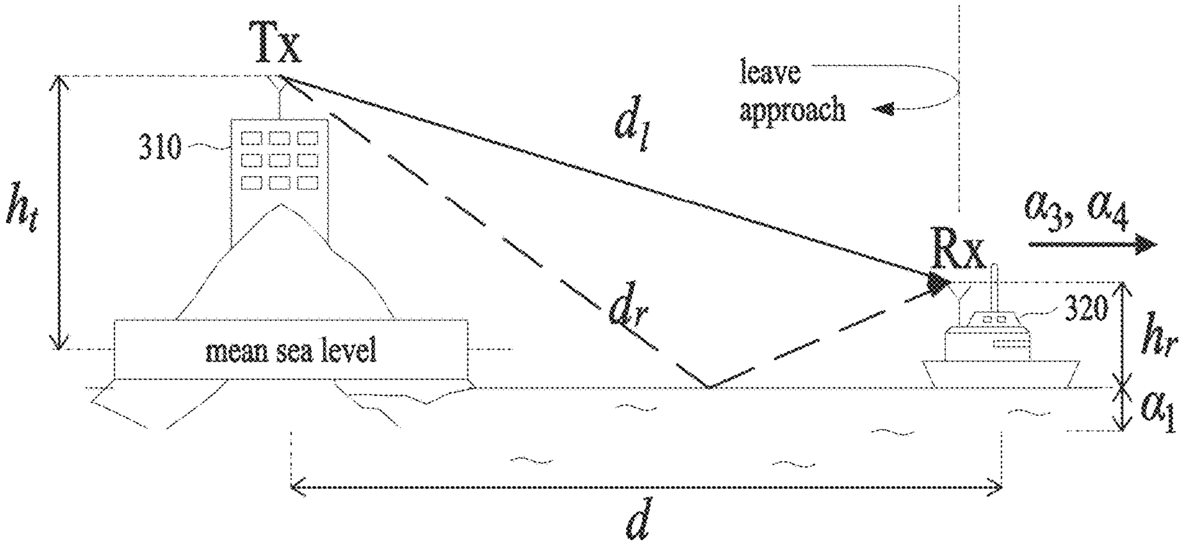

FIGS. 3A and 3B are diagrams for illustrating an input dataset according to an example embodiment FIG. 3A illustrates a measurement environment of a received signal strength at a high tide, and FIG. 3B illustrates a measurement environment of a received signal strength at a low tide.

In an example embodiment, a transmitter $T_x$ of a ground base station 310 may transmit a radio wave to a receiver $R_x$ of a maritime user 320. For example, the transmitter $T_x$ and the receiver $R_x$ may include a transmitting antenna to transmit radio waves and a receiving antenna to receive radio waves, respectively. However, this is only an example, and the antenna of the maritime user 320 may be the transmitting antenna and the antenna of the ground base station 310 may be the receiving antenna.

In an example embodiment, the transmitter $T_x$ may generate a continuous wave signal of the target frequency (e.g., 0.40 GHz, 1.40 GHZ, 2.25 GHZ) and radiate it omnidirectionally. The receiver $R_x$ may receive the radio wave of the target frequency omnidirectionally, and may measure the received signal strength value of the received wave using a spectrum analyzer. At this time, the receiver $R_x$ may amplify the received radio wave through a low noise amplifier, and measure the received signal strength value of the amplified signal.

In an example embodiment, the electronic apparatus 100 may obtain the measured received signal strength value. At this time, the electronic apparatus 100 may obtain measurement environment information corresponding to the measurement time zone. For example, the electronic apparatus 100 may obtain the measurement environment information corresponding to the measurement time zone from an external server.

In an example embodiment, the measurement environment information may include at least one of information on the transmitting antenna of the transmitter $T_x$ and the receiving antenna of the receiver $R_x$ (hereinafter referred to as "transmitting antenna information" and "receiving antenna information," respectively) and information on the maritime environment from which information on the received signal strength value is obtained (hereinafter referred to as "maritime environment information").

As an example, the transmitting antenna information and the receiving antenna information may include at least one of a horizontal distance d between the transmitter $T_x$ and the receiver $R_x$, a frequency f of the radio wave, a gain $G_t$ of the transmitting antenna, a gain $G_r$ of the receiving antenna, a height $h_t$ from mean sea level to the transmitting antenna, and a height $h_r$ from sea level to the receiving antenna. For example, the horizontal distance d between the transmitter $T_x$ and the receiver $R_x$ may be any value from 2 km to 12.5 km, the frequency f of the radio wave may be any value from 0.40 GHz, 1.40 GHz, and 2.25 GHz as in the aforementioned example, the gain $G_t$ of the transmitting antenna and the gain $G_r$ of the receiving antenna may be 2.0 dBi, the height $h_t$ from mean sea level to the transmitting antenna may be 83.8 meters, the height $h_r$ from sea level to the receiving antenna may be 9.5 meters, and the like, but the foregoing values may vary depending on various example embodiments.

Meanwhile, a ray-trajectory based 2-ray model that considers the reflection of the radio waves by the sea surface may result in large prediction errors for large-scale fading as the sea surface height changes. The prediction model according to an example embodiment of the present disclosure can predict large-scale fading by being trained by considering distance information including a direct path $d_l$ and an indirect path $d_r$ of the radio wave radiated from the transmitter $T_x$. In this case, the direct path $d_l$ is the shortest distance path between the transmitter $T_x$ and the receiver $R_x$, and the indirect path $d_r$ may be the reflected path where the radio wave radiated from the transmitter $T_x$ is reflected by the sea surface to reach the receiver $R_x$.

As an example, the maritime environmental information may include at least one of a sea level $\alpha_1$, a wind speed $\alpha_2$, a speed $\alpha_3$ of the maritime user 320, and a travelling direction $\alpha_4$ of the maritime user 320. For example, the sea level $\alpha_1$ may be any value from 6.59 m to 7.06 m during a high tide, such as in FIG. 3A, and any value from 0.49 m to 1.05 m during a low tide, such as in FIG. 3B. Further, for example, the wind speed $\alpha_2$ may be any value from 1.7 m/s to 5.5 m/s during a high tide, such as in FIG. 3A, and any value from 1.3 m/s to 6.4 m/s during a low tide, such as in FIG. 3B. Further, for example, the speed $\alpha_3$ of the maritime user 320 may be set to a value of 5.42 knots. In addition, the travelling direction $\alpha_4$ of the maritime user 320 may be set to a value of −1 for travelling away from the ground base station 310 (leave), 1 for travelling closer (approach), and 0 for turning or any other movement, for example. However, the values described above may vary depending on various example embodiments.

In an example embodiment, the electronic apparatus 100 may generate the input dataset including at least one of the distance information of the radio wave, measurement environment information, and information on the received signal strength value.

Figure 4:
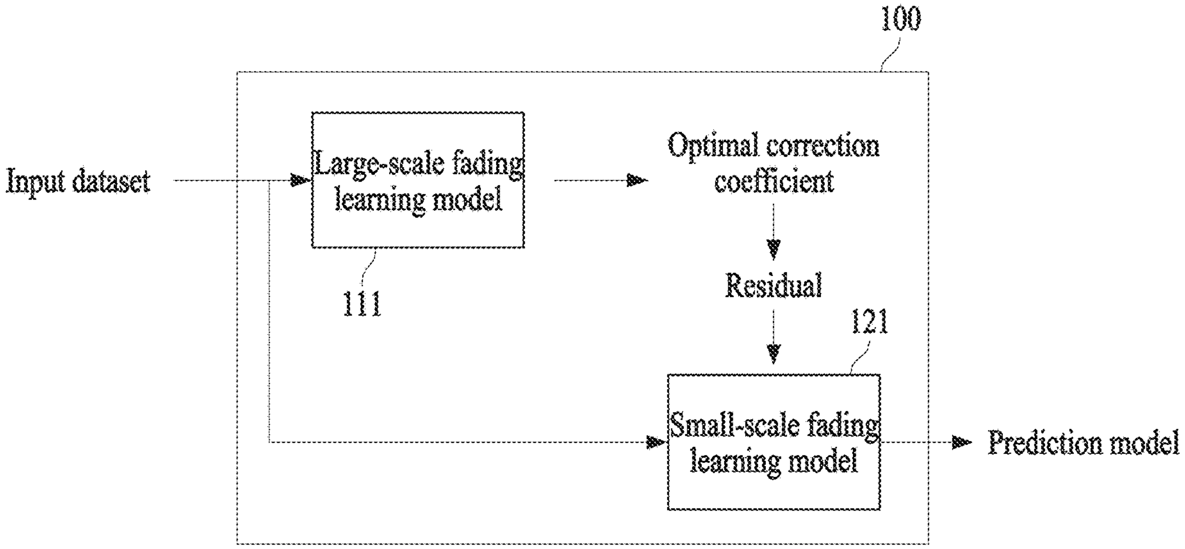
FIGS. 4 to 6 are diagrams illustrating operation of an electronic apparatus according to an example embodiment.
Figure 5:
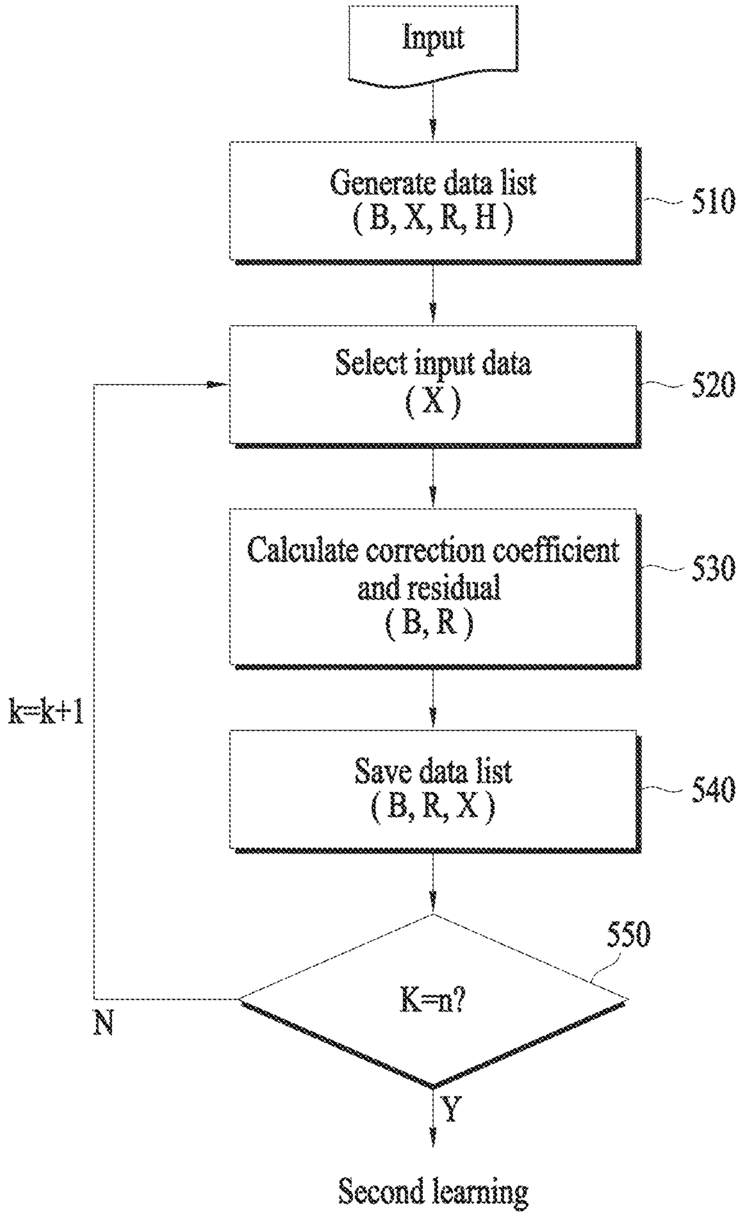
Figure 6:
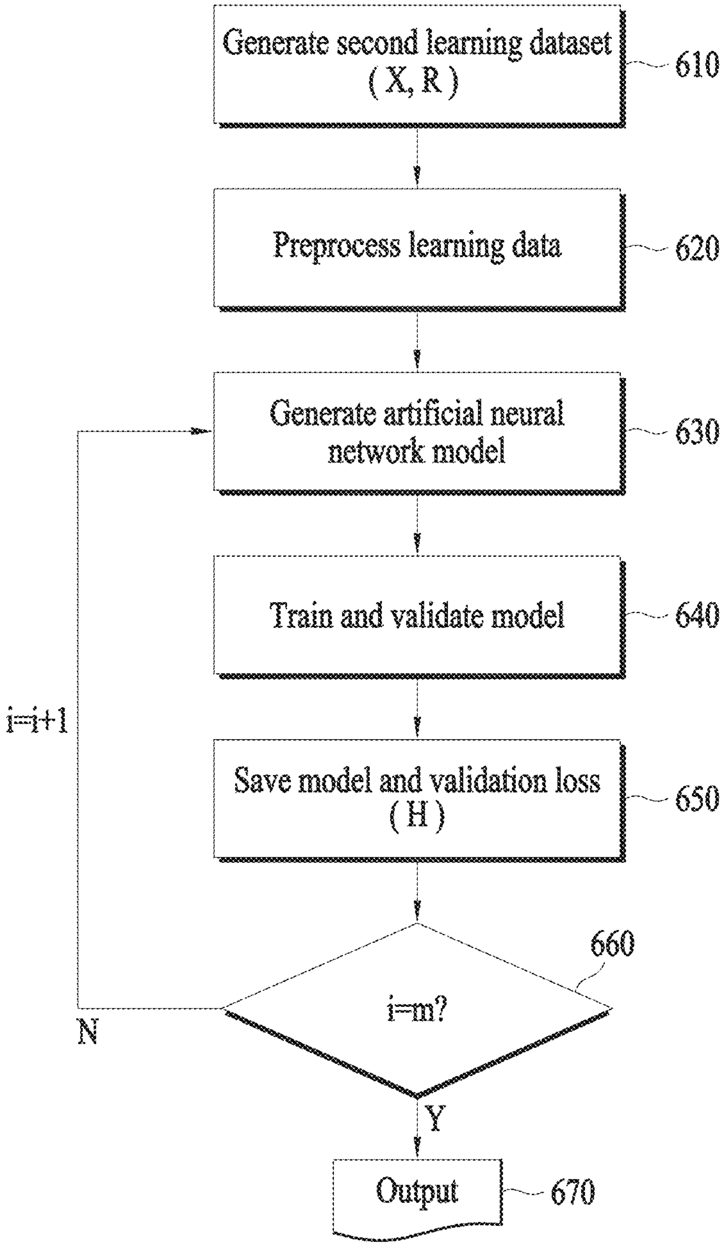

FIGS. 4 to 6 are diagrams illustrating operation of an electronic apparatus 100 according to example embodiments.

Some of the components of the electronic apparatus 100 shown in FIG. 4 may be omitted depending on example embodiments. The components are shown as separate configurations for ease of description only, and one component may be a physical or logical part of another component. In addition, it will be apparent to those skilled in the art that additional components of the apparatus 100 and components external to the apparatus 100 that are not shown in FIG. 4 may be included as well.

In an example embodiment, the electronic apparatus 100 may obtain an optimal correction coefficient based on the input dataset, using a large-scale fading learning model 111.

The optimal correction coefficient may be a coefficient that minimizes the residual between the output of the large-scale fading learning model 111 and the received signal strength value. As an example, the optimal correction coefficient may be a vector consisting of a set of one or more correction coefficients.

For example, the optimal correction coefficient may include a first correction coefficient for the direct and indirect paths, a second correction coefficient for the difference between the direct and indirect paths, and a third correction coefficient to correct the output value of the large-scale fading learning model 111. Specifically, when the first correction coefficient is $\beta_1$, the second correction coefficient is $\beta_2$, and the third correction coefficient is $\beta_3$, the direct path $d_l$ and the indirect path $d_r$ of the wave and the large-scale fading learning model l(d; β) 110 can be expressed by Equation 1 to Equation 3 below, respectively.

$$d_l = \sqrt{d^2 + (h_t + h_r + \beta_1)^2} \qquad \text{[Equation 1]}$$

$$d_r = \sqrt{d^2 + (h_t - h_r + \beta_1)^2} \qquad \text{[Equation 2]}$$

$$l(d;\beta) = \beta_1 + 20\log_{10}\left(\frac{c}{4\pi f}\right) + 20\log_{10}\left|\frac{\sqrt{G_tG_r}}{d_l} + \beta_3\frac{\sqrt{G_tG_r}\,e^{-j2\pi f(d_r-d_l)/c}}{d_r}\right| \qquad \text{[Equation 3]}$$

where, in Equation 3, c is the speed of light (m/s) and j is a unit imaginary number $\sqrt{-1}$.

In an example embodiment, the electronic apparatus 100 can yield the optimal correction coefficient β* by training the large-scale fading learning model 111, defined as in Equation 3, via Equation 5 to minimize the residual r in Equation 4 below.

$$\beta^* = \operatorname{argmin}_\beta \sum_{i=1}^{m} |y_i - l(d_i; \beta)|^2 \quad \text{[Equation 4]}$$

$$r = y - l(d_i; \beta^*) \quad \text{[Equation 5]}$$

where, y in Equation 5 is an actual measured received signal strength value obtained by the electronic apparatus 100.

In an example embodiment, the electronic apparatus 100 may obtain the optimal correction coefficient β* using a method for finding an optimal solution, such as a minimum value, such as the Nelder-Mead method or the interior point method.

In an example embodiment, the electronic apparatus 100 may determine an optimal hyperparameter of an artificial neural network model based on the optimal correction coefficient, using a small-scale fading learning model 121. As an example, the small-scale fading learning model 121 may train an artificial neural network model h consisting of an input layer, a hidden layer, and an output layer. For example, the electronic apparatus 100 may determine the optimal hyperparameter based on at least a portion of data of the input dataset and residual.

As an example, at least a portion of the input dataset can be represented by a vector x in Equation 6.

$$x = [\log_{10} d, \log_{10} f, \alpha_1, \alpha_2, \alpha_3, \alpha_4]^T \quad \text{[Equation 6]}$$

In this case, x can include the maritime environment information as an input feature to the artificial neural network model so that the artificial neural network model can learn the small-scale fading of the wave.

The optimal hyperparameter may be a value that minimizes the sum of squared error of the output of the artificial neural network model and residual. As an example, the optimal hyperparameter may include the number of nodes in the hidden layer of the artificial neural network model. The optimal hyperparameter may be the number of nodes in the hidden layer of the artificial neural network model that minimizes the sum of squared errors of the output of the artificial neural network model and residual.

As an example, if the activation function of the nodes in the hidden layer is φ, the M×N weight matrix connecting the nodes in the input layer and the hidden layer is $\omega_1$(M is the number of features and N is the number of nodes), the N×1 weight matrix connecting the nodes in the hidden layer and the output layer is $\omega_2$, the N×1 bias vector of the input layer is $b_1$, and the bias value of the hidden layer is $b_2$, the artificial neural network model h can be expressed as Equation 7 below.

$$h(x) = w_2^T \varphi(w_1^T x + b_1) + b_2 \quad \text{[Equation 7]}$$

In this case, $\omega_1$, $\omega_2$, $b_1$, $b_2$ can be trained via a back propagation algorithm such that the sum of squared errors of the predicted value h(x) and the residual is minimized. The optimal artificial neural network model that is thus trained to have the optimal hyperparameter is defined as h*(x).

In an example embodiment, the electronic apparatus 100 can generate a prediction model that predicts the signal strength of a received wave for an arbitrary transmitted wave based on the optimal hyperparameter.

In an example embodiment, the generated prediction model can output the sum of the output of the large-scale fading learning model 111 with the optimal correction coefficients reflected and the output of the artificial neural network model with the optimal hyperparameters set. For example, the prediction model ŷ can be expressed as Equation 8 below.

$$\hat{y} = l(d; \beta^*) + h^*(x) \quad \text{[Equation 8]}$$

Referring to FIGS. 5 and 6, the electronic apparatus 100 may output a correction coefficient vector B and an optimal artificial neural network model h* for an input dataset S. Specifically, the input dataset S may be composed of a set of input dataset S(k) including a distance vector d(k), a feature vector X(k), and a measured received signal strength vector Y(k) for the kth measurement case. The measurement cases may include measurement cases at high and low tides and measurement cases for frequencies of the radio waves (e.g., 0.40 GHz, 1.40 GHz, 2.25 GHZ). In this case, the number n of measurement cases is 6. Meanwhile, a vector as described herein may include a multi-dimensional vector, and may be used as a concept encompassing a matrix.

Referring to FIG. 5, a flowchart of a first learning in which the electronic apparatus 100 obtains an optimal correction coefficient using a large-scale fading learning model is shown.

In operation 510, the electronic apparatus 100 may generate a data list. For example, the data list may include B, where the correction coefficient vector is stored, X, where the feature vector is stored, R, where the residual vector is stored, and H, where the artificial neural network model and its validation loss are stored.

In operation 520, the electronic apparatus 100 may select the input data. As an example, the electronic apparatus 100 may select the measurement environment information for the kth measurement case as input data X(k). For example, the electronic apparatus 100 may select input data X(l) for the first measurement case.

In operation 530, the electronic apparatus 100 may calculate the correction coefficient vector B(k) and the residual vector R(k). Specifically, the electronic apparatus 100 may compute the correction coefficient vector B(k) using a large-scale fading learning model as described above, and may compute the residual vector R(k) corresponding to each computed correction coefficient vector B(k).

In operation 540, the electronic apparatus 100 may store the calculated correction coefficient vector B(k) and the residual vector R(k) in the data lists B and R, respectively. Additionally, the electronic apparatus 100 may store X(k) in X.

In operation 550, the electronic apparatus 100 may determine whether k is the number n of the measurement cases. If k is not n, then B(k) and R(k) for the next measurement case can be calculated and stored in B and R, respectively. When this learning process is repeated and data is stored in B, R, and X for all measurement cases, the electronic apparatus 100 may perform a second learning operation.

Referring to FIG. 6, a flowchart of a second learning in which the electronic apparatus 100 obtains an optimal artificial neural network model h*(x) using a small-scale fading learning model is shown.

In operation 610, the electronic apparatus 100 may generate a second learning dataset F. For example, the second learning dataset F may be composed of X and R.

In operation 620, the electronic apparatus 100 may perform preprocessing on the second learning dataset. For example, the electronic apparatus 100 may perform normalization or standardization scaling on the second learning dataset.

In operation 630, the electronic apparatus 100 may generate an artificial neural network model. For example, the electronic apparatus 100 may generate an artificial neural network model having a varying number of nodes in the hidden layer, where the index of the vector for the number of nodes in the hidden layer is defined as i. As an example, if the vector for the number of nodes in the hidden layer is [8, 71, 134, 197, 260, 323, 386, 449, 512], then i=1 indicates that the number of nodes in the hidden layer is 8. The artificial neural network model with the number of nodes in each hidden layer can be instantiated as h.

In operation 640, the electronic apparatus 100 may train and validate the artificial neural network model. For example, the electronic apparatus 100 may train and validate the artificial neural network model h using the preprocessed second learning dataset F. As an example, the electronic apparatus 100 may train and validate the artificial neural network model h using 75% of the preprocessed second learning dataset F as learning data and 25% as validation data.

In operation 650, the electronic apparatus 100 may store the trained artificial neural network model h and the validation loss in H. Thus, the artificial neural network models h generated for all cases regarding the number of nodes in the hidden layer and the validation loss corresponding to each artificial neural network model h may be stored in H.

In operation 660, the electronic apparatus 100 may determine whether i is an index number m of the vector for the number of nodes in the hidden layer. At this time, if i is not m, h of the case about the next index and the verification loss may be stored in H. When this learning process is repeated and data is stored in H for the cases about all indices, in operation 670, the electronic apparatus 100 may output the artificial neural network model with the smallest validation loss as the optimal artificial neural network model h*.

Thereafter, the electronic apparatus 100 may generate the prediction model as in the aforementioned example embodiment via Equation 8.

Figure 7:
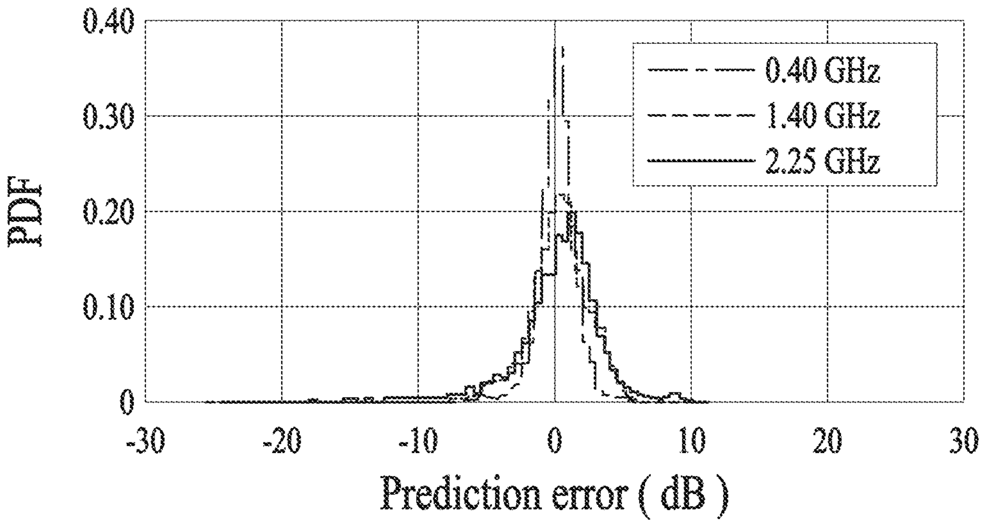
FIG. 7 is a diagram illustrating the performance of a prediction model according to an example embodiment.

FIG. 7 is a diagram illustrating the performance of a prediction model according to an example embodiment Referring to FIG. 7, the error between an output value of the prediction model generated by the electronic apparatus 100 as described above with reference to FIGS. 1 to 6, i.e., the predicted value of the received signal strength and the actual value of the received signal strength, can be seen. Specifically, FIG. 7 illustrates a probability density function (PDF) of the error between the predicted value of the received signal strength and the actual value of the received signal strength.

It can be seen that the probability density function of the error according to an example embodiment has mean values of 0.19 dB, 0.18 dB, and 0.25 dB at 0.40 GHz, 1.40 GHz, and 2.25 GHz, respectively, with standard deviations of 1.52 dB, 2.67 dB, and 3.18 dB.

Figure 8:
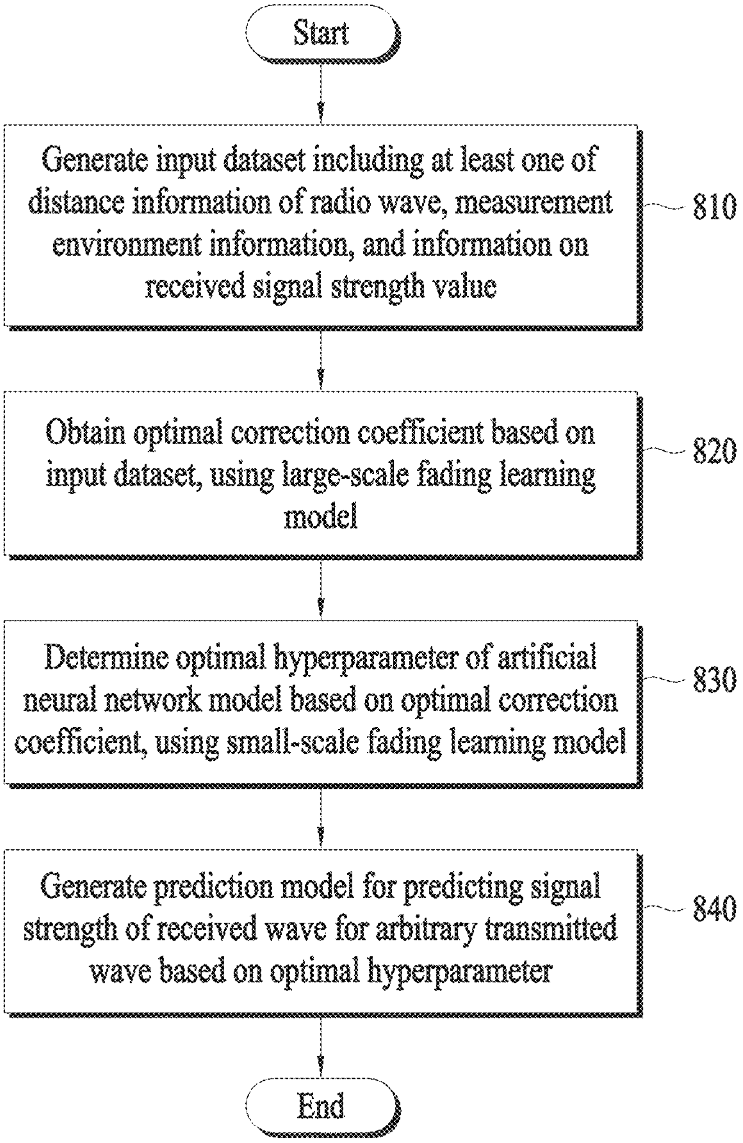
FIG. 8 is a flowchart of how an electronic apparatus generates a signal strength prediction model according to a representative example embodiment

FIG. 8 is a flowchart of how an electronic apparatus generates a signal strength prediction model according to a representative example embodiment In operation 810, the electronic apparatus 100 may generate an input dataset including at least one of distance information of a radio wave, measurement environment information, and information on a received signal strength value.

In an example embodiment according to FIG. 8, the distance information may include distances for a direct path and an indirect path of the radio wave from the transmitting antenna to the receiving antenna, and the measurement environment information may include at least one of information on the transmitting antenna and the receiving antenna, and information on the maritime environment from which the information on the received signal strength value is obtained.

In operation 820, the electronic apparatus 100 may obtain an optimal correction coefficient based on the input dataset, using a large-scale fading learning model.

In an example embodiment according to FIG. 8, the optimal correction coefficient may be one that minimizes the residual between the output of the large-scale fading learning model and the received signal strength value.

In an example embodiment according to FIG. 8, the optimal correction coefficient may include a first correction coefficient for the direct path and the indirect path, a second correction coefficient for the difference between the direct path and the indirect path, and a third correction coefficient that corrects the output value of the large-scale fading learning model.

In operation 830, the electronic apparatus 100 may determine an optimal hyperparameter of an artificial neural network model based on the optimal correction coefficient, using a small-scale fading learning model.

In an example embodiment according to FIG. 8, the electronic apparatus 100 may determine the optimal hyperparameter based on the input dataset and residual.

In an example embodiment according to FIG. 8, the optimal hyperparameter may be one that minimizes a sum of squared errors of the output of the artificial neural network model and residual.

In an example embodiment according to FIG. 8, the optimal hyperparameter may include a number of nodes in the hidden layer of the artificial neural network model.

In operation 840, the electronic apparatus 100 may generate a prediction model that predicts a signal strength of a received wave for an arbitrary transmitted wave based on the optimal hyperparameter.

In an example embodiment according to FIG. 8, the prediction model may output the sum of the output value of the large-scale fading learning model with optimal correction coefficient reflected and the output value of the artificial neural network model with optimal hyperparameter set.

The electronic apparatus according to the above-described example embodiments may include a processor, a memory for storing and executing program data, a permanent storage such as a disk drive, a communication port for communicating with an external device, a user interface device such as a touch panel, a key, a button, or the like. Methods implemented as software modules or algorithms may be stored on a computer-readable recording medium as computer-readable codes or program instructions executable on the processor. Here, the computer-readable recording media include a magnetic storage medium (e.g., ROM (read-only memory), RAM (random-access memory), floppy disk, hard disk, etc.) and an optical reading medium (e.g., CD-ROM and DVD (Digital Versatile Disc)). The computer-readable recording medium may be distributed over networked computer systems, so that computer-readable codes can be stored and executed in a distributed manner. The medium is readable by a computer, stored in a memory, and executed on a processor.

The present example embodiment can be represented by functional block configurations and various processing steps. These functional blocks may be implemented with various numbers of hardware or/and software configurations that perform specific functions. For example, the example embodiment may employ an integrated circuit configuration such as memory, processing, logic, look-up table, or the like, capable of executing various functions by control of one or more microprocessors or other control devices. Similar to that components can be implemented with software programming or software elements, this example embodiment includes various algorithms implemented with a combination of data structures, processes, routines or other programming components and may be implemented with a programming or scripting language including C, C++, Java, assembler, Python, etc. Functional aspects can be implemented with an algorithm running on one or more processors. In addition, the present example embodiment may employ a known technique for at least one of electronic environment setting, signal processing, and data processing. Terms such as "mechanism", "element", "means", and "composition" can be used in a broad sense, and are not limited to mechanical and physical configurations. Those terms may include the meaning of a series of routines of software in connection with a processor or the like.

It will be apparent to those skilled in the art that various modifications and variations can be made in the embodiments of the present invention without departing from the spirit or scope of the invention. Thus, it is intended that the present invention cover the modifications and variations of this invention provided they come within the scope of the appended claims and their equivalents.

What is claimed is:

1. A method for generating a signal strength prediction model in an electronic apparatus, the method comprising:

generating an input dataset comprising at least one of distance information of a radio wave, measurement environment information, and information on a received signal strength value;

obtaining an optimal correction coefficient based on the input dataset using a first-scale fading learning model;

determining an optimal hyperparameter of an artificial neural network model based on the optimal correction coefficient using a second-scale fading learning model; and generating a prediction model for predicting a signal strength of a received wave for an arbitrary transmitted wave based on the optimal hyperparameter.

2. The method of claim 1, wherein the optimal correction coefficient minimizes a residual of an output of the first-scale fading learning model and the received signal strength value.

3. The method of claim 2, wherein the distance information comprises distances for a direct path and an indirect path of the radio wave from a transmitting antenna to a receiving antenna, and the measurement environment information comprises at least one of information on the transmitting antenna and the receiving antenna, and information on a maritime environment from which the information on the received signal strength value is obtained.

4. The method of claim 3, wherein the optimal correction coefficient comprises a first correction coefficient for the direct path and the indirect path, a second correction coefficient for a difference between the direct path and the indirect path, and a third correction coefficient for correcting an output value of the first-scale fading learning model.

5. The method of claim 2, wherein determining the optimal hyperparameter comprises determining the optimal hyperparameter based on the input dataset and the residual.

6. The method of claim 2, wherein the optimal hyperparameter minimizes a sum of squared errors of an output of the artificial neural network and the residual.

7. The method of claim 6, wherein the optimal hyperparameter comprises a number of nodes in a hidden layer of the artificial neural network model.

8. The method of claim 1, wherein the prediction model outputs a sum of an output of the first-scale fading learning model with the optimal correction coefficient reflected and an output of the artificial neural network model with the optimal hyperparameter set.

9. A non-transitory computer-readable storage medium having a program for executing a method for generating a prediction model on a computer recorded thereon, the method comprising:

generating an input dataset comprising at least one of distance information of a radio wave, measurement environment information, and information on a received signal strength value;

obtaining an optimal correction coefficient based on the input dataset using a first-scale fading learning model;

determining an optimal hyperparameter of an artificial neural network model based on the optimal correction coefficient using a second-scale fading learning model; and generating a prediction model for predicting a signal strength of a received wave for an arbitrary transmitted wave based on the optimal hyperparameter.

10. An electronic apparatus for performing a method for generating a prediction model, the electronic apparatus comprising:

a processor; and one or more memory for storing one or more instructions, wherein the one or more instructions, when executed, causes the processor to:

generate an input dataset comprising at least one of distance information of a radio wave, measurement environment information, and information on a received signal strength value;

obtain an optimal correction coefficient based on the input dataset using a first-scale fading learning model;

determine an optimal hyperparameter of an artificial neural network model based on the optimal correction coefficient using a second-scale fading learning model; and generate a prediction model for predicting a signal strength of a received wave for an arbitrary transmitted wave based on the optimal hyperparameter.

* * * * *